United States Patent [19]
Kerlin

[11] Patent Number: 5,146,125
[45] Date of Patent: Sep. 8, 1992

[54] DC ELECTRIC ROTATING MACHINE USING HALL EFFECT MATERIAL

[76] Inventor: Jack H. Kerlin, 984 E. 80 North, Springville, Utah 84663

[21] Appl. No.: 737,221

[22] Filed: Jul. 29, 1991

Related U.S. Application Data

[63] Continuation-in-part of Ser. No. 386,286, Jul. 27, 1989.

[51] Int. Cl.⁵ .............................................. H02K 11/00
[52] U.S. Cl. ............................ 310/68 R; 310/DIG. 3; 310/48; 310/66; 310/156; 307/309; 322/DIG. 5; 338/32 R
[58] Field of Search ...................... 310/68 R, 156, 261, 310/254, 179, 134, 135, 72, 219, 112, 48, 66, DIG. 3, 152, 154; 29/598, 596; 318/254; 307/278, 309; 322/DIG. 5; 338/32 R, 32 H

[56] References Cited

U.S. PATENT DOCUMENTS

| | | | |
|---|---|---|---|
| 2,512,325 | 6/1950 | Hansen, Jr. | 310/219 X |
| 2,536,805 | 1/1951 | Hansen, Jr. | 322/DIG. 5 |
| 3,083,314 | 3/1963 | Ratajski | 310/DIG. 3 |
| 3,123,725 | 3/1964 | Nieda | 310/DIG. 2 |
| 3,165,685 | 1/1965 | Manteuffel | 318/138 |
| 3,375,422 | 3/1968 | Boudigues | 318/138 |
| 3,535,626 | 10/1970 | Uemura | 307/309 |
| 4,242,608 | 12/1980 | Ishigaki | 310/68 |
| 4,311,933 | 1/1982 | Riggs | 310/156 |
| 4,829,248 | 5/1989 | Loubier | 307/309 |

FOREIGN PATENT DOCUMENTS

| | | | |
|---|---|---|---|
| 1258160 | 1/1956 | Fed. Rep. of Germany | 310/DIG. 3 |
| 0029133 | 9/1970 | Japan | 310/DIG. 3 |
| 0134918 | 4/1960 | U.S.S.R. | 310/DIG. 3 |
| 0747708 | 4/1956 | United Kingdom | 322/DIG. 5 |

OTHER PUBLICATIONS

A silicon Hall Effect Latching Switch by J. L. Filippo; Conf. Proceedings of 30th Electr. Components Conference, San Francisco, CA; (Apr. 1980).

*Primary Examiner*—R. Skudy
*Attorney, Agent, or Firm*—Mallinckrodt & Mallinckrodt

[57] ABSTRACT

An electric rotating machine, which can be operated as either a motor or generator, utilizes material exhibiting a Hall effect to replace the normal slip rings or mechanical commutation devices. Preferably, a slab of Hall effect material is curved to extend circumferentially around the rotor between the rotor and stator, and the rotor is adapted to create a magnetic field. When used as a motor, a source of electrical power is connected to the Hall effect material to cause a primary current to flow therein. The combination of the rotor magnetic field and the primary current flowing in the Hall effect material produces a Hall effect current which creates a torque on the rotor causing it to rotate. When used as a generator, the rotor is rotated and induces a primary current to flow in the Hall effect material. The combination of the rotor magnetic field and the induced primary current produces a Hall effect voltage and current that can be connected to power an electrical load.

28 Claims, 2 Drawing Sheets

DC ELECTRIC ROTATING MACHINE USING HALL EFFECT MATERIAL

RELATED APPLICATIONS

This is a continuation-in-part of my copending application Ser. No. 07/386,286, filed Jul. 27, 1989.

BACKGROUND OF THE INVENTION

Field

The invention is in the field of electrical motors and generators.

State of the Art

Electrical motors operate on the principle that a current flowing in a conductor normal to a magnetic field will have a force acting on it that is normal to both the direction of current flow and the direction of the magnetic field. Conversely a generator operates on the principle that a force exerted on a conductor normal to a magnetic field will cause a current to flow in the conductor in a direction normal to both the direction of the force and the magnetic field.

In order for motors or generators to rotate, at least one of the three mutually normal parameters of magnetic field, current, or force must rotate. In order to effect this and preserve the orthogonality of the three parameters during rotation, the rotors are usually equipped with commutators or slip rings, commutators being used on DC machines and slip rings on AC machines.

In a typical commutator DC machine the stator field is stationary which means the rotor field must also be stationary. But since the rotor is turning, the rotor field must rotate relative to the rotor in order to remain fixed with respect to the stationary stator field. Rotation of the rotor field relative to the rotor is accomplished by commutation (switching) of the DC input.

The AC machine takes two different forms: synchronous and induction (asynchronous). In terms of stator design the two types are identical. For both types the stator simply provides a rotating magnetic field derived from the AC supply. They differ only in rotor design and function.

A synchronous machine has a fixed DC rotor field, i.e., the rotor field does not rotate relative to the rotor. The rotor field is produced by either a permanent magnet or an electro-magnet requiring slip-rings to bring current into the rotating rotor. Since there can be no relative motion between stator and rotor fields, the rotor must rotate at the same frequency as the stator field, hence the term "synchronous". This machine develops torque only at synchronous speed. Without auxiliary windings it produces no starting torque. This drawback along with the necessity of slip-rings and brushes, has limited the utility of the synchronous machine.

The predominant AC machine in use today incorporates the induction principle. The rotor slips relative to stator field rotation. This relative motion between stator field and the rotor induces by transformer action a voltage in the rotor. The resulting rotor current produces a rotor magnetic field that rotates relative to the rotor at slip frequency in order to remain fixed with respect to the rotating stator field. The induction motor produces good starting torque and requires no mechanical contact (slip-rings) with the rotor.

The so-called "brushless DC motor" is a synchronous machine with a permanent magnet rotor relying on a variable frequency supply, such as a solid-state inverter, to provide the rotating stator field. Inverter frequency is synchronized with rotor speed by shaft feed back sensors allowing starting torque by starting with zero frequency. The name comes from its similarity with a permanent magnet (stator) DC motor wherein the mechanical commutation has been replaced with solid-state switching. Roles of stator and rotor are reversed to eliminate slip-rings.

With the exception of the homopolar machine, all elecric machines require inversion of DC to AC by either mechanical or electronic means and cannot operate directly from a DC supply. A number of DC power sources such as solar cells and fuel cells are being developed as energy sources available to operate motors. Most DC energy sources are characterized by low voltage and high current. With DC energy sources, it would be advantageous to improve the means for inverting the DC to AC and in all motors it would be advantageous to eliminate the commutation means or slip rings. Because the homopolar machine can run directly from a low voltage, high current DC source it is attactive for certain applications. However, the problem of transmitting the high current to and from the rotor in a homopolar machine remains.

In 1879 E. H. Hall discovered that certain materials exhibit an effect, now known as the Hall effect, wherein the passage of an electric current through the material, in a direction normal to a magnetic field passing through the material, caused an electromotive force or voltage to be developed in the material normal to both the current flow and the magnetic field. The polarity of the voltage depends upon the direction of the magnetic field. This effect has been utilized in a number of semiconductor devices generally used as sensors to sense the presence and strength of a magnetic field or the position of magnetic material. As such, Hall effect sensors have been used in connection with electric motors to sense the position of a magnetic rotor as it rotates to cause operation of electronic switching means to control energization of stator coils to operate the motor.

SUMMARY OF THE INVENTION

According to the invention, material exhibiting a Hall effect, in combination with the rotor magnetic field, eliminates the need for slip rings or commutators in an electric motor or generator. The material exhibiting a Hall effect is positioned within the magnetic field of the rotor. With a current flowing through the material exhibiting the Hall effect in a primary direction normal to the magnetic field, a Hall effect current is generated by the magnetic field in a direction normal to both the direction of primary current flow and the magnetic field. In a motor, this Hall effect current is the torque current which produces the torque on the rotor, while in a generator, the Hall effect current is the output current.

In a motor application of the invention, a DC current is passed through the material exhibiting the Hall effect in a primary direction normal to the rotor magnetic field passing through the material. Conductor means are coupled to the material exhibiting the Hall effect to carry a torque or Hall effect current generated by the material as a result of the Hall effect which flows in the material in a direction normal to both the magnetic field through the material and the primary direction of current flow, thereby creating a force on the rotor causing it to rotate when the torque current flows. The flow of the torque or Hall effect current through the Hall effect material is the means, and the only or sole means, for creating torque on the rotor. No other means, such as separate stator coils, are provided. As the rotor, and thus the magnetic field, rotate with respect to the material exhibiting the Hall effect, the magnetic field through any part of the material varies and reverses when the rotor has rotated 180 degrees. Therefore, the necessary commutation or switching of the torque current is accomplished directly by the Hall material in response to the rotating magnetic field of the motor rotor, thus eliminating the need for slip rings or commutators.

In a preferred embodiment of the invention, a DC current is caused to flow circumferentially through a cylindrical slab of material exhibiting a Hall effect. The rotor is positioned within this cylindrical slab and is fashioned from a permanent magnet material having its magnetic field directed diametrically across its axis. This magnetic field will then be directed at right angles to portions of the Hall material which are opposite the poles of the permanent magnet rotor, and thus will also be at right angles to the DC current flowing through the Hall material. The combined effect of the crossed magnetic field and the DC current will be to induce a transverse electric field in the Hall material. A conductor is connected in the shape of a loop between opposite edge faces of the Hall material, and thus an induced current, i.e., the Hall effect current, will flow transversely through the Hall material, and around the loop, under the influence of the induced field. This induced current in the Hall material, being normal to the rotor magnetic field, will create a force on the rotor, causing it to rotate.

Approximately sixty such current loops, as described above, may be positioned equi-distantly around the ring of Hall material. Thus, as the rotor rotates its magnetic poles interact successively with successive loops, causing the rotor to keep on rotating.

In order to increase the flux density of the magnetic field of the rotor, magnetic material is positioned circumferentially around the slab of Hall material. This serves to close the flux loop of the rotor magnet, thus significantly reducing the reluctance of the magnetic path.

In a generator application, the rotor is caused to rotate by an external torque. This results in a primary current being induced to flow transversely through the slab of material exhibiting the Hall effect and through primary current conductor means coupled to the material. This induced current flowing through material exhibiting the Hall effect creates torque on the rotor which must be overcome by the means causing the rotor to rotate. This induced current is the means, and the sole means, providing torque on the rotor opposing rotation of the rotor. Again, there are no other means, such as separate stator coils, provided. A longitudinal current is generated in the material exhibiting the Hall effect as a result of the Hall effect and flows circumferentially around the slab of material, being normal to both the magnetic field of the rotor and the induced primary current. As in the case of the motor, the rotor, and thus the magnetic field, rotates with respect to the material exhibiting the Hall effect. The magnetic field through any part of the material, and also the transverse current generated therein, varies and reverses when the rotor has rotated 180 degrees, thus keeping the DC current induced by the Hall effect flowing circumferentially through the slab in the same direction. Therefore, again, the need for commutators or slip rings has been eliminated.

The invention also includes the method of eliminating slip rings, mechanical commutation means, or the like by substituting therefore material exhibiting a Hall effect which directly replaces such means to produce the torque current in a motor or the output current in a generator. In a motor, a primary current is caused to flow in the material exhibiting a Hall effect in a primary direction and the material is placed in the magnetic field generated by the rotor so that the material produces a Hall effect or torque current which flows normal to the magnetic field and creates a force on the rotor causing it to rotate. In a generator, the material is positioned and the rotor is rotated to induce a primary current in the material which causes a Hall effect output electrical field. This will cause an output current to flow when the generator is connected to an electrical load.

THE DRAWINGS

In the accompanying drawings, which represent the best mode presently contemplated for carrying out the invention:

FIG. 1 is a perspective view of a slab of material which exhibits a Hall effect showing the current generated as a result of the Hall effect;

FIG. 2, a schematic perspective view of an electrical motor constructed according to the invention;

FIG. 3, a schematic top plan view of the cylindrical slab of Hall effect material of the motor of FIG. 2 extended in flat configuration;

FIG. 4, a perspective view of a different embodiment for the slab of Hall effect material of the motor of FIG. 2, including a partial cross section of magnetic material surrounding each slab of Hall effect material and the respective conductors for carrying the Hall effect current;

FIG. 5, a perspective view similar to that of FIG. 4, but showing the same magnetic material surrounding all slabs of Hall effect material and the respective conductors for carrying the Hall effect current; and FIG. 6, a schematic showing of the equivalent electrical circuit of a motor of the invention.

DETAILED DESCRIPTION OF THE ILLUSTRATED EMBODIMENT

Figure 1:
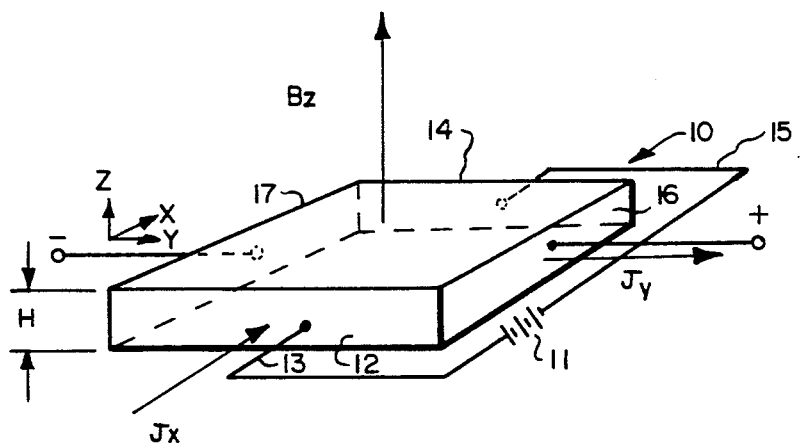

In certain materials, the application of a magnetic field to the material when current is flowing through the material will cause an electromotive force to be developed in the material normal to both the current and the magnetic field. This effect is called the Hall effect. FIG. 1 shows a block 10 of material which exhibits the Hall effect, also referred to herein as Hall material or Hall effect material. FIG. 1 illustrates the known properties of material exhibiting a Hall effect so represents prior art. The positive terminal of a source of Direct Current (DC) electrical power, such as a battery 11, is attached to end 12 of the material 10 through conductor 13 and the negative terminal of the source of DC electrical power is attached to the other end 14 of the material through conductor 15 to form an electric field, referred to as the input field $E_x$, across Hall effect material 10. A current density $J_x$, treated hereinafter as a current, and referred to as current $J_x$, flows from the power source 11 through conductors 13 and 15 and through Hall effect material 10 between ends 12 and 14 thereof. The coordinate arrows in FIG. 1 point in the positive direction.

If a magnetic field $B_z$ is applied to the Hall effect material 10 having a thickness h, FIG. 1, in a direction z perpendicular to the flow of current $J_x$, electrons flowing in the x direction experience a Lorentz force in the y direction. This force is effectively an electric field referred to as the output field, which creates a voltage between the sides 16 and 17 of the Hall material which can drive a current $J_y$ through an external circuit. Also, current $J_y$ flowing in the y direction produces a similar Hall field in the negative x direction acting against flow of current $J_x$. Thus, input and output x and y circuits are coupled via the magnetic field. The effectiveness of this coupling determines the efficiency of energy transfer between x and y circuits. The value of current $J_y$ is given as follows:

EQUATION 1

$$J_y = \mu B_z J_x + \alpha E_y$$

where
$\mu$ = charge carrier mobility in meter $^2$/volt-sec
$\alpha$ = Hall material electrical conductivity in ohm$^{-1}$-meter$^{-1}$
$B_z$ = flux density or "magnetic induction" in Teslas This shows that output current $J_y$ will increase with $\mu B_z$ for a given output field $E_y$ and a current $J_x$. Energy transfer efficiency is a function of mobility $\mu$ and magnetic field $B_z$ since the change in current $J_y(dJ_y)$ for a change in current $J_x(dJ_x)$ is expressed as follows:

$$dJ_y/dJ_x = \mu B_z$$

For an open y circuit where $J_y = 0$:

EQUATION 2

$$E_y = -\frac{\mu B_z}{\alpha} J_x$$

For positive $B_z$ and $J_x$ the negative sign in the Equation 2 represents force in the negative y direction opposing further charge build-up on side 16 of the Hall material. Equation 2 shows that the direction (algebraic sign) of $E_y$ changes as the direction (sign) of $B_z$ changes for a constant direction of $J_x$ (DC current). Thus the Hall effect may be used to convert a DC input to an AC output by reversing the direction of magnetic field $B_z$.

In a purely resistive DC Hall device the maximum efficiency is given:

EQUATION 3

$$E_{max} = \frac{[(1 + \mu^2 B^2)^{\frac{1}{2}} - 1]}{[(1 + \mu^2 B^2)^{\frac{1}{2}} + 1]}$$

As shown by Equation 3, the device efficency is dependent solely upon the mobility and the magnetic field.

Most electric machines depend on a rotating magnetic field. The field rotates either relative to the stator (typical of AC machines) or relative to the rotor (typical of DC machines). With a DC power supply the rotating field can only be generated by switching field or armature coils sequentially into the DC circuit. The result of such switching is to produce essentially an AC current within a given coil. The Hall phenmomenon provides a means of converting a DC input into an AC coil current by merely alternating the polarity of the magnetic field.

Figure 2:
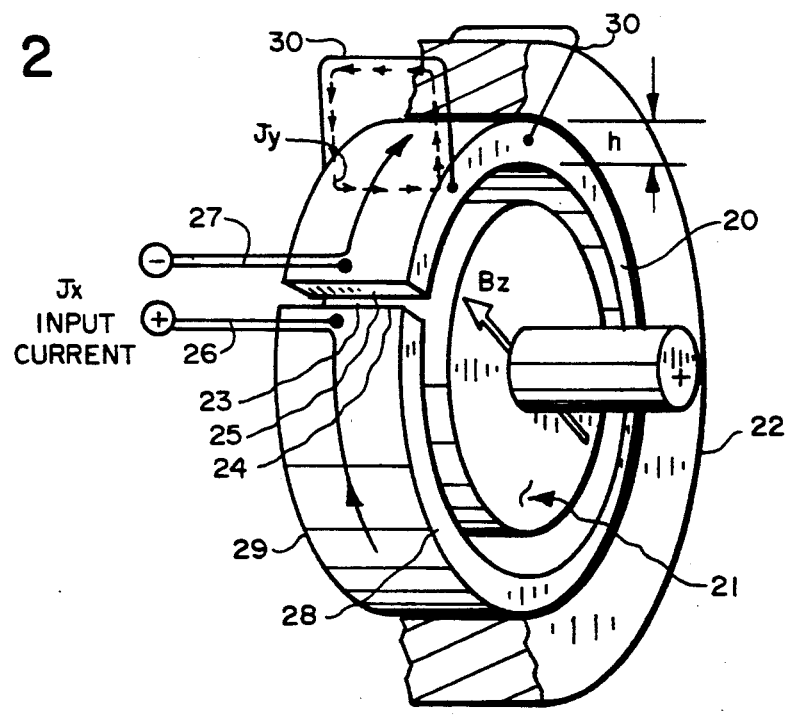

FIG. 2 shows the essential features of a Hall effect rotary motor. A cylindrical slab of Hall material 20 is curved along its length to extend circumferentially around the rotor 21 between rotor 21 and magnetic shell material 22 to form a Hall ring. The slab of Hall material 20 preferably extends substantially completely around rotor 21 with an axial break or gap 23 formed between slab ends 24 and 25. A DC power source is connected through conductors 26 and 27 to the respective ends 24 and 25 of the slab. This causes current $J_x$ (solid lines) to flow circumferentially within the Hall material from end to end thereof. This is the primary direction of current flow in the Hall material. Gap 23 may be left open as an air gap or filled with nonconducting material. Magnetic shell material 22 is magnetic material, with a relative permeability greater than unity, which closes the flux loop for the magnetic field created by the rotor.

Any given point on the slab of material sees an alternating magnetic field as the rotor turns. This magnetic field, which is normal to the direction of current flow $J_x$, causes an electric field to be generated, as explained above, between edge faces 28 and 29 of the Hall material. Conductors 30 are connected between edge faces 28 and 29 so that current $J_y$, generated by the Hall effect exhibited by Hall material 20, and which can be referred to as Hall effect current, will flow transversely (dotted lines) through the Hall material into the loop conductors 30 and back to the origin to complete the circuit. Only two loop conductors are shown for clarity. In practice there are many such loop conductors spaced around the slab of Hall material.

The current $J_y$ flowing in each of the loop conductors 30 flows transversely through the slab of Hall material, and being normal to the rotor magnetic field, produces shaft torque. The loop conductors 30 are wrapped around magnetic shell material 22. Rotor rotation creates a counter emf (negative $E_y$) tending to reduce current $J_y$ flowing in loop conductors 30. Current $J_y$ can only be maintained as RPM increases by increasing current $J_x$ as indicated in Equation 1. Input field $E_x$, proportional to input voltage, must be raised accordingly to increase current $J_x$. Thus, input electrical power is proportional to output mechanical power.

As rotor 21 rotates, the magnetic field created by the rotor also rotates. Thus, the magnetic field through any axial slice of the Hall material varies as the rotor rotates. This causes the current in each individual loop conductor 30 and through the Hall material aligned therewith to vary and to reverse as the magnetic field through the material varies and reverses. This insures that any Hall effect current flowing in the material and loop conductor is such to create torque on the rotor.

An easy way to understand Hall switching is to examine the force (reaction torque) on a single current loop. Equation 4 gives the force $F_x$ on a single loop conductor carrying current $J_y$ in normal magnetic field $B_z$:

EQUATION 4

$$F_x = -J_y B_z$$

As pointed out earlier, when the sign (polarity) of magnetic field $B_z$ changes, so also does the sign (direction) of current $J_y$ change. In a purely resistive circuit the sign changes occur simultaneously and the sinusoidal functions of current magnetic field $J_y$ and $B_z$ remains unchanged. Torque is unidirectional regardless of rotor position. Torque direction can only be reversed by reversing the direction of current $J_x$. Thus, to reverse the direction of rotation of the motor, the direction of current $J_x$ must be reversed.

Carrier mobility $\mu$ is the chief factor in good efficiency. Mobility in metals is very low compared to certain semiconductors. However, metals have an electron concentration several orders of magnitude greater than semiconductors which explains their superior conductivity, since:

EQUATION 5

$$\alpha = e\mu\rho$$

where
 $\alpha$ = electrical conductivity
 $\rho$ = carrier density
 $e$ = carrier charge
 $\mu$ = carrier mobility Conductivity coefficent $\alpha$ does not appear in the efficiency, Equation 3. Only mobility is of concern. However, conductivity appears in terms of $\rho$ required for power density as will be seen in Equation 9. Some semiconductor materials, such as indium antimonide and mercury cadmium telluride, exhibit a strong Hall effect and have mobilities many hundreds of times greater than metals, but also have low carrier density and thus relatively poor conductivity. If the Hall ring is made of such materials, the thickness h of the ring must be substantial to provide sufficient electrons to minimize resistive losses.

The gap between the rotor and the magnetic shell material, filled with non-magnetic semiconductor material, represents a large air gap or reluctance in the magnetic circuit. The correspondingly high mmf to achieve a field of 1 Tesla or more cannot be obtained with an electro-magnet rotor coil, unless cooling is employed. However, recent advances in high coercivity, high magnetic induction rare-earth (neodymium) permanent magnets, such as GM's MAGNEQUENCH, are capable of high fields across a large air gap.

Figure 3:
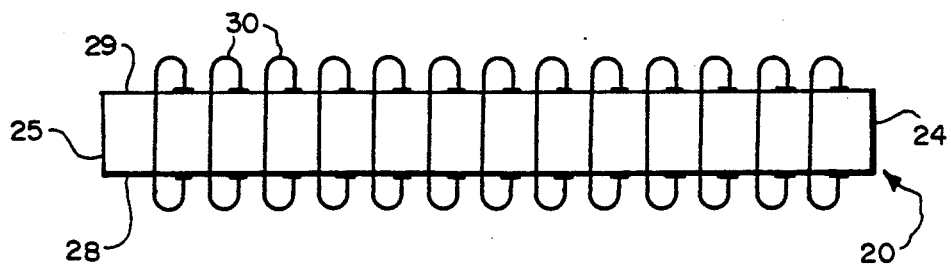

The low conductivity of the Hall material means continuous metallic electrodes cannot be used on the x and y faces of the Hall material. A continuous strip of metal on the y (edge) faces would short out the input field $E_x$. Similarly, strips on the x (end) faces would short-circuit generated output field $E_y$. A continuous y face or edge electrode can be replaced with multiple independent circuits making substantially point contacts with the Hall material. The two loop conductors 30 shown in FIG. 2 are therefore replicated many times along the entire length of the slab of Hall material, as shown schematically in FIG. 3, wherein the slab of Hall material is shown in flattened condition.

Figure 4:
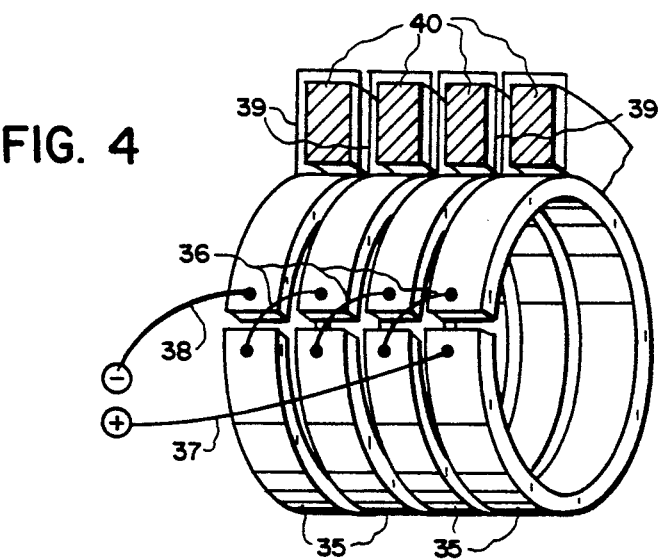

The same multi-circuit technique cannot be used on the x face (ends) since only a single circuit can connect the Hall material with the outside world. Losses due to electrode shorting, called end-effects, can be minimized by making the length to width ratio of the slab very large, preferably at least 10:1. In order to get a given width of Hall material with desired length to width ratio, it may be necessary to provide several individual slabs in side-by-side configuration. The slab configuration then takes the form shown in FIG. 4. Individual slabs 35 of Hall material may be connected in series, parallel, or combinations thereof depending on the voltage of the DC source. FIG. 4 shows the slabs connected in series by conductors 36, with conductors 37 and 38 extending to the power source. As depicted, each slab of Hall material 35 has a corresponding shell of magnetic material 40 surrounding it. Conductor loops 39 connecting the edge faces of individual slabs of Hall material encircle the corresponding shell 40 of magnetic material.

Figure 5:
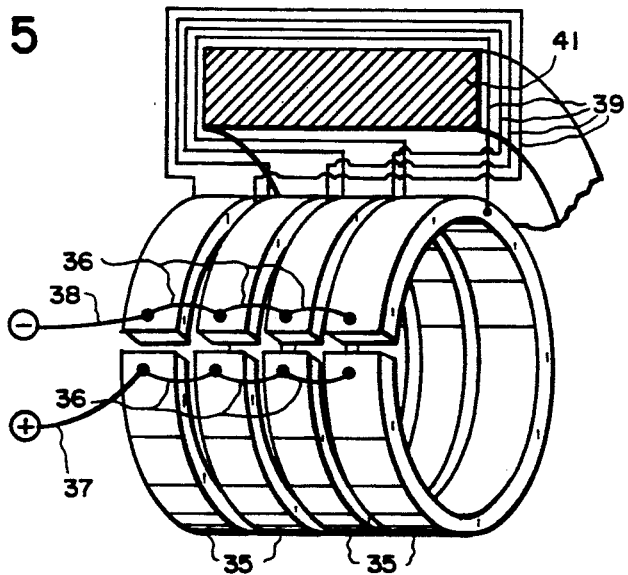

Another embodiment is shown in FIG. 5. In this embodiment, the slabs of Hall material 35 are connected in parallel by conductors 36 with conductors 37 and 38 extending to the power source. A single shell of magnetic material 41 circumferentially surrounds the group of side-by-side slabs. The conductor loops 39 each encircle the shell 41, as shown. Either configuration of magnetic material 40 or 41 as shown in FIGS. 4 and 5 could be used with either the series or parallel conection of the slabs.

It should be emphasized that while the loop conductors comprise individual AC circuits, the current $J_x$ and electric field $E_x$ are non-fluctuating DC. The Hall slab is in effect a series connection of many small Hall elements, each with a different magnitude of current $J_y$ and magnetic field $B_z$. The input sees the summation of all elements which sum is constant for any rotor position. Attempts to use Hall devices for external switching (inverter) would prove very inefficient since the usual 3-phase bridge arrangement places switches in parallel with the DC supply. Poor coupling between input and output occurs as $B_z$ passes through zero when changing polarity. An inverter using Hall devices would be efficient only if the magnetic field could change polarity "instantly" across each device, in effect, having a square waveform.

In the illustrated motor application of the Hall effect, allowance must be made for inductive effects in the circuit. In an AC circuit there is always a reactive current component 90° out of phase with the $B_z$, i.e., with the induced voltage. This is due to leakage ractance in each loop conductor arising from imperfect flux coupling between adjacent loops. The resulting phase displacement angle $\theta$ is a function of shaft frequency as given by Equation 6:

EQUATION 6

$$\sin\theta = \frac{X}{Z}$$

where:
 $X = \omega L$ = leakage reactance
 $L$ = leakage inductance
 $\omega$ = radian frequency = $2\pi(\text{RPM})/60$
 $Z = (R_L^2 + X^2)^{\frac{1}{2}}$ = loop circuit impedance
 $R_L$ = loop conductor resistance Maximum obtainable machine efficiency is given by Equation 7.

EQUATION 7

$$E = \frac{\left[\left(1 + \frac{u^2 B_0^2 \cos^2\frac{\theta}{2}}{2H}\right)^{\frac{1}{2}} - 1\right]\cos\theta}{\left[\left(1 + \frac{u^2 B_0^2 \cos^2\frac{\theta}{2}}{2H}\right)^{\frac{1}{2}} + 1\right]\cos^2\frac{\theta}{2}}$$

Divisor H is given by Equation 8:

EQUATION 8

$$H = \left[\frac{Z}{R_H}\left(1 - \frac{R_H^2 X^2}{Z^4}\right)^{\frac{1}{2}} + \cos\theta\right]$$

where $R_H$ = resistance of Hall material.

In the ideal case with zero resistive losses, $R_L = 0$; $X = 0$ (assuming perfect coupling); $\theta = 0$. Then $H = 1$ and Equation 7 equals Equation 3 since all Hall output power appears as mechnaical shaft power. The factor H accounts for resistive circuit losses claiming a portion of the Hall ring output, whereas in Equation 3 all DC Hall device power appears in a resistive load as intended.

The factor "2" in Equation 7 accounts for the sinusoidal distribution of flux along the slab of Hall material where $B_o$ = peak value. The B in Equation 3 is the RMS value of $B_{rms} = B_o/\sqrt{2}$. Therefore, $B^2$ in Equation 3 becomes $B_o^2/2$ in Equation 7.

Using actual values of mobility for indium antimonide of 7.7 m²/V-sec and a magnetic field of 1.4 Tesla in Equation 7, with $H = 1$, gives an efficiency of 77%. For mercury cadmium telluride with $\mu = 15$ m²/V-sec, efficiency = 87%.

These are ideal values for efficiency taking into account only the inherent resistance of the Hall semiconductor material. Conductor loop resistance $R_L$, end losses, losses due to finite number of current loops and finite contact area of loops with the Hall ring, all contribute to degradation of performance in addition to core and windage losses common to all electric machines. The tradeoff to lower efficiency is the elimination of a high-frequency inverter while the motor retains the simplicty of an AC induction machine. Materials research to raise room-temperature semiconductor mobility is expected to improve machine efficiency to competitive levels.

The semiconductor materials named above currently have the highest known mobility at room temperature. They are presently produced in small quantities in the form of thin (0.20) wafers sliced from crystaline ingots, lapped and polished and sold by the square inch for use primarily in Hall effect sensors. A motor of pancake configuration can use wafers directly. Laminated iron core fabrication, however, is easier with the standard cylindrical shape for which Hall rings shaped according to FIG. 4 are preferable. A tubular polycrystalline ingot of the indicated semiconductor material could be grown from which Hall rings illustrated can be sliced. Another method would use powdered metal technology in which ingot material is pulverized and pressed into molds of cylindrical shape, then sintered below decrystalization temperature. Polycrystalline material can also be cast to the desired shape. In addition, individual flat pieces or slabs of the Hall material can be connected together to extend around the rotor, approximating the slab format shown.

Output power density of the motor of the invention at maximum efficiency is given by Equation 9.

EQUATION 9

$$\frac{HP}{Lb.} = (1.11 \times 10^{-12})(ep)\left(\frac{B_o}{\sqrt{2}}\right)\left(\frac{hr}{K^2}\right)(RPM)^2 \frac{\cos\theta}{\cos^2\frac{\theta}{2}}$$

where:
$\rho$ = carrier density, m⁻³
$e$ = carrier charge, coul.
$h$ = radial thickness of Hall ring, inches
$r$ = rotor radius, inches
$k$ = ratio of stator O.D. to rotor diameter
$\theta$ = phase displacement angle Equation 9 gives the horsepower per pound of motor including an iron shell, permanent magnet rotor and Hall rings. Housing, end bells, etc., are not included.

For an example of power density using indium antimonide, let:
$e = 1.6 \times 10^{-19}$ coul.
$\rho = 2 \times 10^{16}/cm^3 = 2 \times 10^{22}/m^3$
$h = 0.25$ in.
$r = 3$ in.
$B_o = 1.4$ T
$k = 1.4$
(RPM) = 9000
Then (HP)/Lb. = 0.11

This is about 2½ times the power density of a standard 3600 RPM induction motor. At 9000 RPM an AC induction motor would have comparable power density but would require a 150 Hz inverter.

Equation 9 seems to indicate the only limit to power density is shaft speed and the attendant centrifugal stress. Actually, at maximum efficiency, current $J_y$ is proportional to RPM. Input voltage is also proportional to RPM. The proportionality of both $\sigma$ and voltage to RPM explains the squared function of RPM to power output. Thus another limitation to power density is the iron shell staturation due to large loop current $J_y$ occuring at high speed at maximum efficiency. Equation 10 expresses power density limitation due to saturation without regard to efficiency:

EQUATION 10

$$\frac{HP}{Lb} = (10^{-3})(RPM)\frac{B_o^2}{K^2}$$

Equation 10 gives the ultimate machine power density in terms related to centrifugal stress (RPM) and magnetic saturation ($B_o$) where efficiency is not taken into account. At RPM = 3600; $B_o = 1.4$ T; $k = 1.4$; power density = 3.6 HP/Lb. The reason this is so much higher than can be obtained in a standard induction motor is the extremely high loop current possible before saturation due to the high reluctance magnetic circuit containing the permanent magnet rotor which has a permeability about the same as air. Most hard permanent magnets have a relative permeability = 1, the same as air. Because of I²R losses and the tremendous heat dissipation, this power density could never be attained in practice. Equation 10 does indicate potential power density with forced water cooling. Equating Equations 9 and 10 gives the maximum speed at maximum efficiency within the saturation limit.

Figure 6:
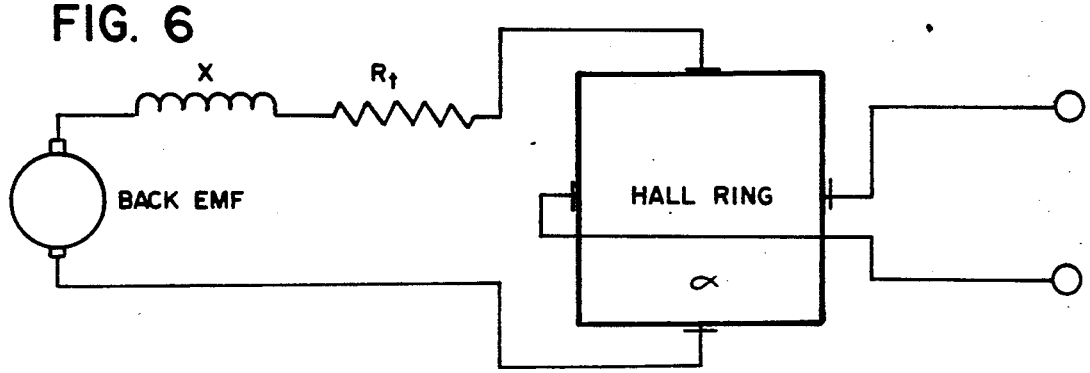

FIG. 6 shows a schematic diagram of the equivalent circuitry of the motor illustrated in FIG. 2. X represents the leakage reactance, $R_1$ represents the total resistance of the current loop, and $\alpha$ is the electrical conductivity of the Hall material.

Although construction of a motor according to the invention has only been shown schematically, from such showing it would be obvious to those skilled in the art how to construct such a motor in practice. The motor is constructed in the same manner as currently constructed electric motors except that the space between the rotor and magnetic material shell which replaces the normal stator is made large enough to accept the Hall material therebetween. The wiring of the Hall material and shell are as shown. With a permanent magnet rotor of six inch diameter, the Hall material will be about one-quarter inch thick. The thickness of the shell magnetic material surrounding the Hall material has to be such that it can carry the applied magnetic flux without saturation. This generally means that the cross-sectional area of the shell magnetic material must be equal to about one-half the cross-sectional area of the rotor, so with a rotor of six inch diameter the shell will be about three inches thick to provide a three inch thick shell on both sides of the rotor. It is preferred to provide as many conducting loops as possible connected to the edges of the Hall material, but the connections must be such and far enough apart so as to not short out the edges of the material. About sixty loops each located about six degrees apart around the slab of Hall material appears to be satisfactory.

While a curved slab of Hall material as shown is presently preferred, as mentioned, individual pieces of Hall material can be connected together to substantially form the illustrated slab, or other placement and connection of individual pieces of Hall material could be used.

While the invention has been described in detail as an electric motor wherein a source of electric power is connected to supply the primary current in the Hall effect material, indicated above as $J_x$, as with most electric motors, the apparatus of the invention can also be used as an electric generator. In such instance, the rotor is turned by an outside force and electrical power is generated and can be taken from the apparatus at the same terminals where electrical power is supplied to the apparatus when operated as a motor.

When operated as a generator, and using the apparatus of FIG. 2 as an example, the rotating magnetic field created by the rotating rotor induces the current $J_y$ to flow through the slab of Hall effect material in line with loop conductors 30 and through loop conductors 30. This induced current is now the primary current flowing through the Hall effect material. This primary current causes the Hall effect material to generate current $J_x$ to flow in the Hall effect material and through any electrical load connected to conductors 26 and 27.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An electric rotating machine, comprising a rotor mounted for rotation, said rotor adapted to create a rotor magnetic field; means to produce torque on the rotor; material exhibiting a Hall effect positioned within the rotor magnetic field; means for causing a primary current to flow through the material exhibiting the Hall effect in a primary direction normal to the rotor magnetic field; and conductor means coupled to the material exhibiting the Hall effect, said conductor means, together with the Hall effect material to which it is coupled, forming a plurality of loops to carry Hall effect current generated in the material exhibiting the Hall effect through the material exhibiting the Hall effect in a direction normal to the primary direction of primary current flow and also normal to the rotor magnetic field without said Hall effect current passing through separate stator coils, wherein said Hall effect current flowing in the material exhibiting the Hall effect interacting with the rotor magnetic field is the means to produce torque on the rotor and cause operation of the machine as a rotor.

2. An electric rotating machine according to claim 1, wherein the rotor includes a permanent magnet which creates the magnetic field.

3. An electric rotating machine according to claim 1, wherein the material exhibiting the Hall effect extends circumferentially around at least a portion of the rotor.

4. An electric rotating machine according to claim 3, wherein the material exhibiting the Hall effect is a slab of material having a width, a length, and a thickness, with opposing edge faces extending along the length of the slab defining the thickness thereof and opposing end faces extending along the width of the slab defining the thickness thereof, and wherein the slab is curved along its length to extend circumferentially around at least a portion of the rotor.

5. An electric rotating machine according to claim 4, wherein the length of the slab is at least ten times greater than the width of the slab.

6. An electric rotating machine according to claim 4, additionally including magnetic material, with a relative permeability greater than unity, extending circumferentially around the slab of material exhibiting the Hall effect to close a flux loop for the magnetic field created by the rotor.

7. An electric rotating machine according to claim 6, wherein the primary current flows substantially through the length of the slab.

8. An electric rotating machine according to claim 7, wherein the conductor means includes a plurality of individual conductors spaced along the length of the slab, each of which is connected at similarly spaced points between the opposing edge faces of the slab.

9. An electric rotating machine according to claim 8, wherein each of the plurality of individual conductors, together with the slab to which it is connected, forms a closed loop around the magnetic material.

10. An electric rotating machine according to claim 6, wherein there are a plurality of slabs of material exhibiting a Hall effect electrically interconnected so that primary current will flow substantially from end to end in each of the slabs, and wherein said conductor means are provided for each slab and are connected between respective opposing edge faces of each slab.

11. An electric rotating machine, comprising a rotor mounted for rotation, said rotor adapted to create a rotor magnetic field; a plurality of slabs of material exhibiting a Hall effect positioned in side-by-side configuration within the rotor magnetic field, each slab having a width, a length, and a thickness, with opposing edge faces extending along the length of the slab defining the thickness thereof and opposing end faces extending along the width of the slab defining the thickness thereof, and wherein each of the slabs is curved along its length to extend circumferentially around at least a portion of the rotor; magnetic material, with a relative permeability greater than unity, extending circumferentially around the plurality of slabs to close a flux loop for the magnetic field created by the rotor; means electrically interconnecting the plurality of slabs so that current can flow from end to end in each of the slabs; a plurality of conductor means spaced along the length of and associated with each slab interconnecting respective opposing edge faces of that slab; and means for causing a primary current flow through the material exhibiting the Hall effect in a primary direction normal to the rotor magnetic field to cause the material exhibiting the Hall effect to generate a Hall effect current in the material exhibiting the Hall effect in a direction normal to the primary direction of said primary current flow and also normal to the rotor magnetic field.

12. An electric rotating machine according to claim 11, wherein the slabs are connected electrically in series.

13. An electric rotating machine according to claim 11, wherein the slabs are connected electrically in parallel.

14. An electric rotating machine according to claim 11, wherein the magnetic material extending circumferentially around the plurality of slabs of material exhibiting a Hall effect positioned in side-by-side configuration includes separate magnetic material extending circumferentially around and associated with each of the slabs.

15. An electric rotating machine according to claim 14, wherein each of the plurality of conductor means, together with the slab to which it is connected, forms a closed loop around its associated magnetic material.

16. An electric rotating machine according to claim 11, wherein the magnetic material extending circumferentially around the plurality of slabs of material exhibiting a Hall effect positioned in side-by-side configuration extends circumferentially around the plurality of slabs.

17. An electric rotating machine according to claim 16, wherein each of the plurality of conductor means, together with the slab to which it is connected, forms a closed loop around the magnetic material.

18. An electric rotating machine according to claim 11, wherein the means for causing a primary current flow through the material exhibiting the Hall effect is an outside source which causes said primary current to flow from end to end in each of the slabs, wherein the Hall effect current flows through the material exhibiting the Hall effect and the plurality of conductor means to produce torque on the rotor causing it to rotate, whereby the electric rotating machine operates as an electric motor.

19. An electric rotating machine according to claim 11, wherein the means for causing a primary current flow is an outside force causing rotation of the rotor to induce said primary current flow in the material exhibiting the Hall effect and in the plurality of conductor means, and wherein the Hall effect current flows from end to end in each slab and is available to power an outside electrical load, whereby the electric rotating machine operates as an electric generator.

20. An electric rotating machine, comprising a rotor mounted for rotation, said rotor adapted to create a rotor magnetic field; means to produce torque on the rotor; material exhibiting a Hall effect positioned within the rotor magnetic field; means for rotating the rotor to induce a primary current to flow through the material exhibiting the Hall effect in a primary direction normal to the rotor magnetic field; conductor means coupled to the material exhibiting the Hall effect, said conductor means, together with the Hall effect material to which it is coupled, forming a plurality of loops to carry primary current induced in the material exhibiting the Hall effect without said induced current passing through separate stator coils; and output means coupled to the material exhibiting a Hall effect to carry to an outside electrical load Hall effect current generated in the material exhibiting the Hall effect in a direction normal to the primary direction of primary current flow and also normal to the rotor magnetic field, wherein said induced primary flowing in the material exhibiting the Hall interacting with the rotor magnetic field is the means to produce torque on the rotor and the machine operates as the generator.

21. An electric rotating machine according to claim 20, wherein the rotor includes a permanent magnet which creates the magnetic field.

22. An electric rotating machine according to claim 20, wherein the material exhibiting the Hall effect extends circumferentially around at least a portion of the rotor.

23. An electric rotating machine according to claim 22, wherein the material exhibiting the Hall effect is a slab of material having a width, a length and a thickness, with opposing edge faces extending along the length of the slab defining the thickness thereof and opposing end faces extending along the width of the slab defining the thickness thereof, and wherein the slab is curved along its length to extend circumferentially around at least a portion of the rotor.

24. An electric rotating machine according to claim 23, wherein the length of the slab at least ten times greater than the width of the slab.

25. An electric rotating machine according to claim 23, additionally including magnetic material, with a relative permeability greater than unity, extending circumferentially around the slab of material exhibiting the Hall effect to close a flux loop for the magnetic field created by the rotor.

26. An electric rotating machine according to claim 25, wherein the conductor means includes a plurality of individual primary current conductors spaced along the length of the slab, each of which is connected at similarly spaced points between the opposing faces of the slab and together with the slab form a loop current path at least a portion of which extends transversely to the rotor magnetic field so that a current is induced therein as the rotor magnetic field rotates.

27. An electric rotating machine according to claim 26, wherein each of the plurality of individual primary current conductors, together with the slab to which it is connected, forms a closed loop around the magnetic material.

28. An electric rotating machine according to claim 26, wherein there are a plurality of slabs of material exhibiting a Hall effect electrically interconnected so that Hall effect current can flow substantially from end to end in each of the slabs, and wherein each slab has primary current conductors between respective opposing edge faces of the slab.

* * * * *